(12) United States Patent
Rivera

(10) Patent No.: US 9,586,709 B1
(45) Date of Patent: Mar. 7, 2017

(54) APPARATUS AND METHOD FOR CONSTRUCTING ESPRESSO CARTRIDGES

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 0 days.

(21) Appl. No.: 15/187,444

(22) Filed: Jun. 20, 2016

(51) Int. Cl.
  *B65B 29/02* (2006.01)
  *B65B 67/02* (2006.01)
  *B65B 7/28* (2006.01)
  *B65B 1/24* (2006.01)
  *B30B 9/30* (2006.01)
  *A47J 31/06* (2006.01)

(52) U.S. Cl.
  CPC ............. *B65B 29/02* (2013.01); *B65B 1/24* (2013.01); *B65B 7/28* (2013.01); *B65B 67/02* (2013.01); *A47J 31/0689* (2013.01); *B30B 9/3053* (2013.01)

(58) Field of Classification Search
  CPC B65B 1/24; B65B 7/28; B65B 7/2842; B65B 7/285; B65B 29/02; B65B 67/02; B30B 9/28; B30B 9/3053; A47J 31/0663; A47J 31/0668; A47J 31/0689; A47J 31/085
  USPC ......... 53/436, 471, 485, 488, 523, 527, 281, 53/284.5, 300, 363, 364, 390; 99/287; 100/229 A, 234, 243; 425/318
  See application file for complete search history.

(56) References Cited

U.S. PATENT DOCUMENTS

| | | | | |
|---|---|---|---|---|
| 643,443 A | * | 2/1900 | Aiken | B30B 9/067 100/116 |
| 818,812 A | * | 4/1906 | Bartholomew | B65B 67/10 53/122 |
| 2,046,367 A | * | 7/1936 | Collins | B65B 1/24 141/12 |
| 2,181,945 A | * | 12/1939 | Komarik | B65B 1/24 141/390 |
| 2,626,738 A | * | 1/1953 | Nordquist | B65B 1/24 141/146 |
| 2,693,752 A | * | 11/1954 | Garapolo | B65B 1/24 100/256 |

(Continued)

FOREIGN PATENT DOCUMENTS

| | | | | |
|---|---|---|---|---|
| DE | 2003483 A1 | * | 8/1971 | ........... B30B 9/3053 |
| DE | 3514512 C1 | * | 6/1986 | ............... B65B 1/24 |

(Continued)

*Primary Examiner* — Stephen F Gerrity
(74) *Attorney, Agent, or Firm* — Kenneth L. Green; Averill & Green

(57) ABSTRACT

Apparatus and method for constructing an espresso cartridge. A cartridge holder includes a generally horizontal holder rim for supporting an espresso cartridge rim of an espresso cartridge base. The espresso cartridge base may be inserted into the horizontal holder rim vertically or horizontally in an interference fit positioning the espresso cartridge rim on a top edge of the horizontal holder rim of the cartridge holder. A spacer is closeable over the horizontal holder rim and aligned with an espresso cartridge mouth of the espresso cartridge base creating a scoop having an additional untamped brewing material volume provided by the spacer. A tamper is pressed into the spacer to tamp the brewing material into the espresso cartridge base to provide tamped brewing material even with the cartridge rim. A plastic rim/foil center lid is snapped onto the filled and tamped espresso cartridge base to complete construction of the espresso cartridge.

14 Claims, 8 Drawing Sheets

(56) References Cited

U.S. PATENT DOCUMENTS

| | | | | |
|---|---|---|---|---|
| 3,748,819 A | * | 7/1973 | Christensson | B65B 43/50 53/527 |
| 4,957,753 A | * | 9/1990 | Bardsley | B65B 1/24 220/624 |
| 5,526,733 A | * | 6/1996 | Klawuhn | A47J 31/0663 99/287 |
| 5,637,335 A | * | 6/1997 | Fond et al. | B65B 29/02 426/111 |
| 5,941,055 A | * | 8/1999 | Coates | B65B 29/06 425/112 |
| 6,481,338 B1 | * | 11/2002 | Wai | A47J 31/0663 99/302 R |
| 8,479,638 B2 | * | 7/2013 | Leung | A47J 31/44 99/287 |
| 2011/0162533 A1 | * | 7/2011 | Fumagalli | A47J 31/0668 99/295 |
| 2013/0167729 A1 | * | 7/2013 | Hoare | A47J 31/0663 99/280 |
| 2016/0157661 A1 | * | 6/2016 | Torquemada | A47J 31/0657 99/323 |

FOREIGN PATENT DOCUMENTS

| | | | | |
|---|---|---|---|---|
| DE | 102006010772 A1 | * | 9/2007 | B65B 1/24 |
| DE | 102010048513 A1 | * | 4/2012 | A47J 31/0668 |
| DE | 102013005597 A1 | * | 10/2014 | A47J 31/0663 |
| EP | 0524464 A1 | * | 1/1993 | B65B 29/02 |
| EP | 1576912 A2 | * | 9/2005 | A47J 31/0668 |
| EP | 1997748 A1 | * | 12/2008 | B65B 29/02 |
| FR | 2620680 A1 | * | 3/1989 | B65B 25/06 |
| FR | 2895660 A1 | * | 7/2007 | A47J 31/0663 |
| FR | 2900810 A1 | * | 11/2007 | A47J 31/0663 |
| WO | WO 2007080258 A2 | * | 7/2007 | A47J 31/0663 |
| WO | WO 2012080814 A1 | * | 6/2012 | A47J 31/0689 |
| WO | WO 2015118446 A1 | * | 8/2015 | B65B 29/02 |
| WO | WO 2016001883 A1 | * | 1/2016 | B65B 29/02 |

* cited by examiner

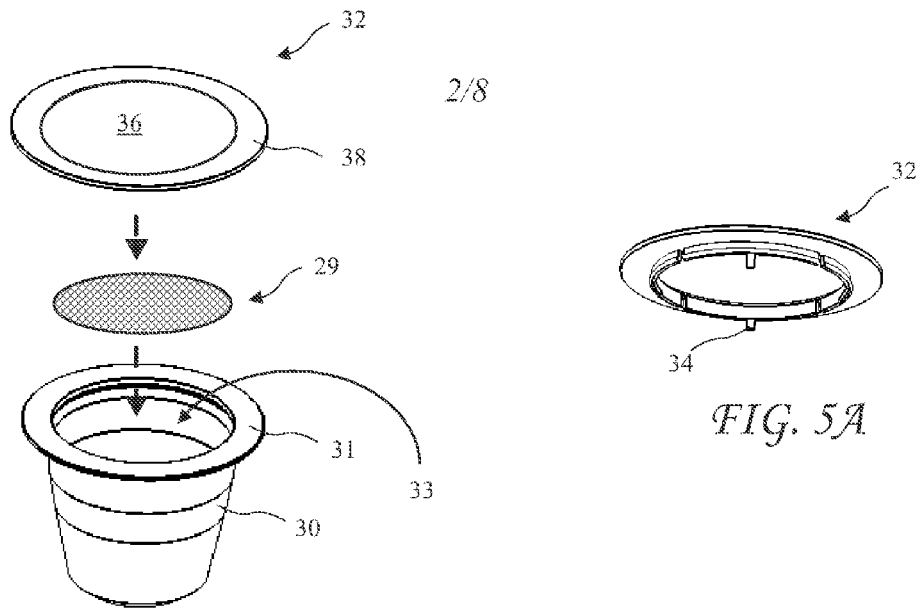
FIG. 5
FIG. 5A
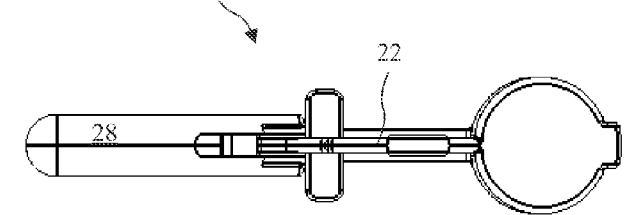
FIG. 6D
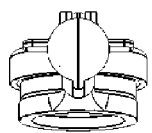
FIG. 6C
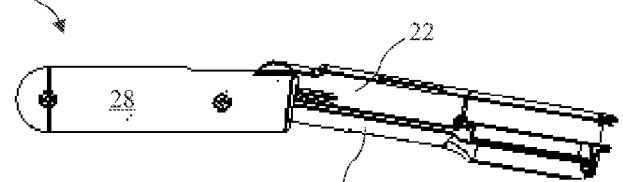
FIG. 6A
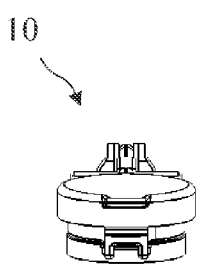
FIG. 6B
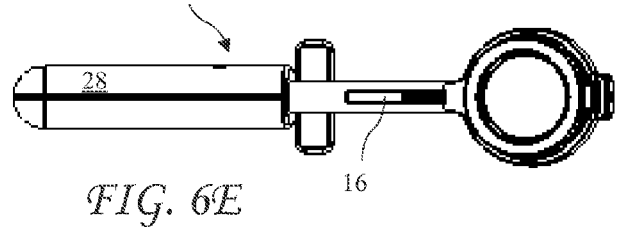
FIG. 6E

APPARATUS AND METHOD FOR CONSTRUCTING ESPRESSO CARTRIDGES

BACKGROUND OF THE INVENTION

The present invention relates brewed beverages and in particular to espresso cartridges.

Espresso beverages are made by forcing high pressure water into tightly packed, finely ground coffee. The ground coffee is contained in a holder commonly called a "porta-filter" or into an espresso cartridge. High-pressure water is forced through the ground coffee and beverage is extracted in small, concentrated amounts. Many espresso drinkers prefer the simplicity of using the espresso cartridges, but are limited in the selection of ground coffee to varieties available in the pre-packaged espresso cartridges, and the cost of a single cartridge.

BRIEF SUMMARY OF THE INVENTION

The present invention addresses the above and other needs by providing an apparatus and method for constructing an espresso cartridge. A cartridge holder includes a generally horizontal holder rim for supporting an espresso cartridge rim of an espresso cartridge base. The espresso cartridge base may be inserted into the horizontal holder rim vertically or horizontally in an interference fit positioning the espresso cartridge rim on a top edge of the horizontal holder rim of the cartridge holder. A spacer is closeable over the horizontal holder rim and aligned with an espresso cartridge mouth of the espresso cartridge base creating a scoop having an additional untamped brewing material volume provided by the spacer. A tamper is pressed into the spacer to tamp the brewing material into the espresso cartridge base to provide tamped brewing material even with the cartridge rim. A plastic rim/foil center lid is snapped onto the filled and tamped espresso cartridge base to complete construction of the espresso cartridge.

In accordance with one aspect of the invention, there is provided a cartridge tool providing a scoop for measuring a pre-tamped portion of brewing material. The tool includes a spacer which attaches over a cartridge base and combines with the volume of the cartridge base to provide the proper pre-tamped volume of brewing material.

In accordance with another aspect of the invention, there is provided a cartridge tool providing a tamping for tamping a pre-tamped portion of brewing material into the cartridge base. The tamper sides through the spacer to compress the brewing material into the cartridge providing the proper tamping of the brewing material.

In accordance with yet another aspect of the invention, there is provided a cartridge base and lid for assembling an espresso cartridge. The lid snaps onto the base and includes a foil center punctured by an espresso machine during use.

In accordance with another aspect of the invention, there is provided a method for constructing a brewing cartridge. The method includes inserting a brewing cartridge base into the cartridge holder, closing the spacer over the brewing cartridge base aligned with the brewing cartridge base, using the brewing cartridge base and spacer to scooping a portion of untamped brewing material, aligning a tamping piston with the spacer, pressing the tamping piston into the spacer, tamping the untamped brewing material completely into the brewing cartridge base, withdrawing the tamper piston from the spacer, opening the spacer, removing the brewing cartridge base from the cartridge holder, and attaching a brewing cartridge lid to the brewing cartridge base.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 5 shows a cartridge lid and base according to the present invention.

FIG. 5A shows attaching features of the cartridge lid according to the present invention.

FIG. 6A shows a side view of the tool according to the present invention.

FIG. 6B shows a front view of the tool according to the present invention.

FIG. 6C shows a rear view of the tool according to the present invention.

FIG. 6D shows a top view of the tool according to the present invention.

FIG. 6E shows a bottom view of the tool according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1:
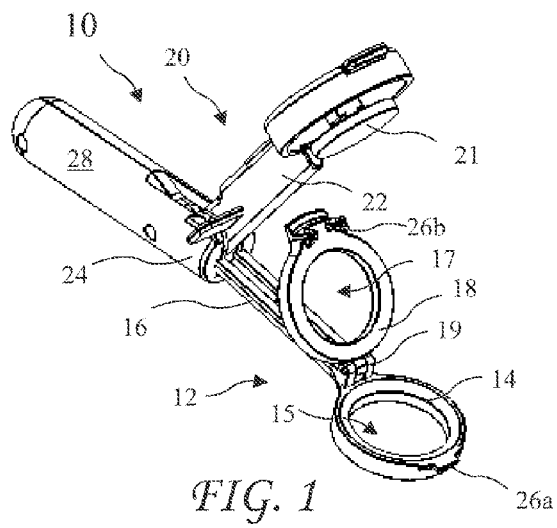
FIG. 1 shows a tool for assembling a tamped brewing cartridge, according to the present invention.
Figure 2:
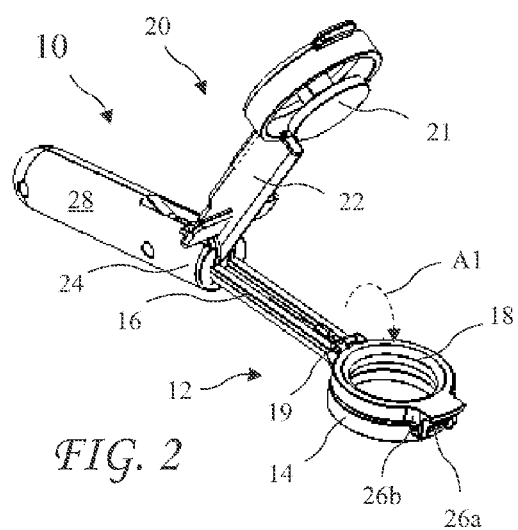
FIG. 2 shows the tool for assembling the tamped brewing cartridge with a spacer closed on a cartridge holder, according to the present invention.
Figure 3:
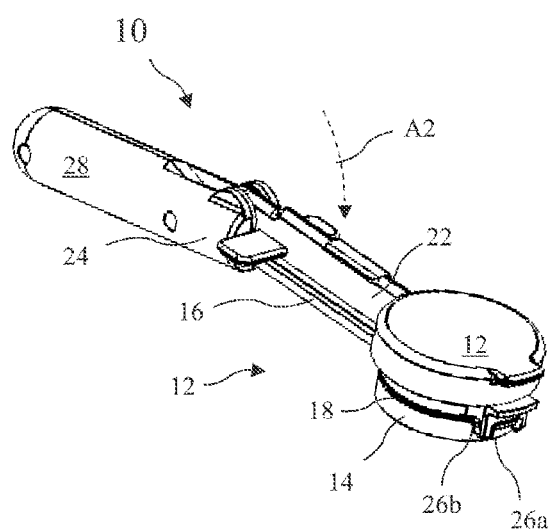
FIG. 3 shows the tool for assembling the tamped brewing cartridge with the spacer closed on the cartridge holder and a tamper closed on the spacer, according to the present invention.
Figure 4:
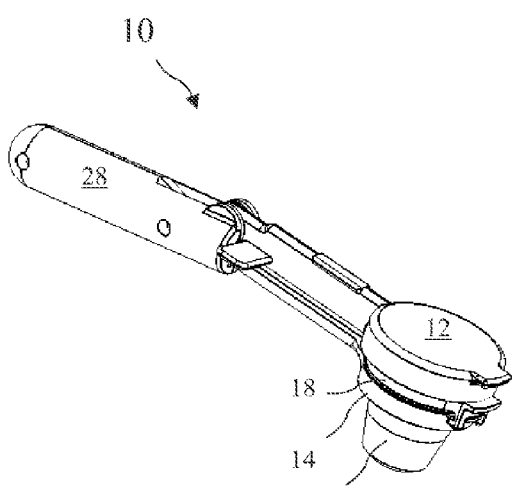
FIG. 4 shows the tool for assembling the tamped brewing cartridge with the spacer closed on the cartridge holder holding a cartridge base and a tamper closed on the spacer, according to the present invention.

A tool 10 for assembling a tamped brewing cartridge is shown in FIG. 1, the tool 10 with a spacer 18 closed on a cartridge holder 12 is shown in FIG. 2, the tool 10 with the spacer closed 18 on the cartridge holder 12 and a tamper 20 including a tamper piston 21 is closed on the spacer 18 is shown in FIG. 3, and the tool 10 with the spacer 18 closed on the cartridge holder 12 holding a cartridge base and the tamper 20 closed on the spacer 18, is shown in FIG. 4. The cartridge holder 12 includes a generally horizontal holder rim 14 at the end of a holder arm 16. The generally horizontal holder rim 14 may be a closed circle receiving the cartridge base vertically, or "U" shaped receiving the cartridge base horizontally, and the cartridge base 30 is preferably an interference fit into the generally horizontal holder rim 14. A handle extension 28 extends back from a holder arm 16 for grasping by a user to scoop a portion of the untamped brewing material from a brewing material container.

The spacer 18 closes over the spacer 14 and preferably attaches to the spacer 14, for example by latches 26a and 26b. The spacer 14 may include a spacer pivot 19 which aligns a spacer passage 17 through the spacer 18 with a holder passage 15 through the holder rim 14. The spacer passage 15 has diameter D, a height H, and a volume V. The diameter D is preferably between 1.0 and 1.2 inches and more preferably about 1.135 inches, the height H is preferably between 0.15 and 0.25 inches, and more preferably about 0.2 inches, and the volume is preferably about 0.2 cubic inches, plus or minus ten percent. The volume V determines the amount of brewing material tamped into the cartridge base to provide a tamped cartridge.

Initially, an empty cartridge base 30 is inserted into the cartridge holder 12, and the spacer 18 is attached over the horizontal holder rim 14. The tool 10 is then used as a scoop to fill the cartridge base 30 with brewing material and the volume V of the spacer 18. Following filling, the tamper 20 is closed on the spacer 18 and the tamper piston 21 enters the spacer 18 compacting the brewing material to be entirely within the cartridge base 30. The tamper 20 and spacer 18 may then be separated from the cartridge holder 12 and the filled and tamped cartridge base removed from the cartridge holder 12, and a cartridge lid 32 attached to the cartridge base 30 (see FIG. 5).

A cartridge lid 32 and the cartridge base 30 are shown in FIG. 5 and attaching features 34 of the cartridge lid 32 for attaching to the cartridge base 30 are shown in FIG. 5A. The cartridge base 30 includes a cartridge mouth 33 for receiving brewing material 29. The cartridge lid 32 includes a rim 38 and a foil center 36.

A side view of the tool 10 is shown in FIG. 6A, a front view of the tool 10 is shown in FIG. 6B, a rear view of the tool 10 is shown in FIG. 6c, a top view of the tool 10 is shown in FIG. 6D, and a bottom view of the tool 10 is shown in FIG. 6E.

Figure 7D:
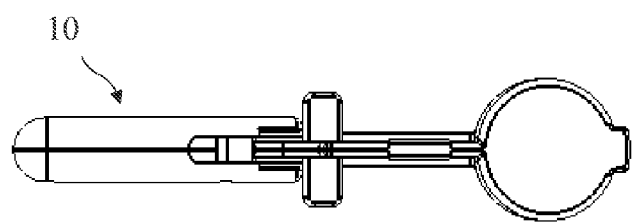
FIG. 7D shows a top view of the tool according to the present invention with the brewing cartridge base held in the tool.
Figure 7C:
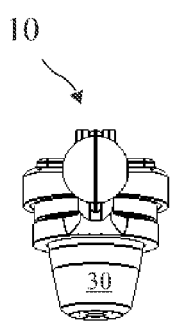
FIG. 7C shows a rear view of the tool according to the present invention with the brewing cartridge base held in the tool.
Figure 7A:
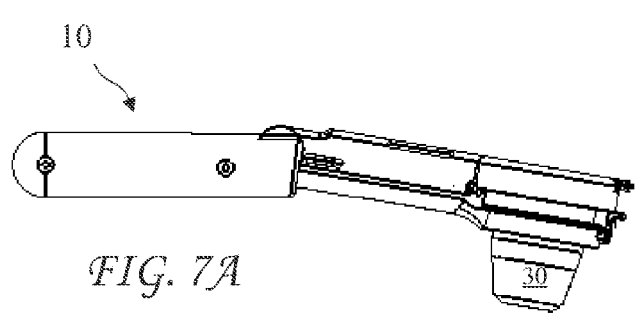
FIG. 7A shows a side view of the tool according to the present invention with a brewing cartridge base held in the tool.
Figure 7B:
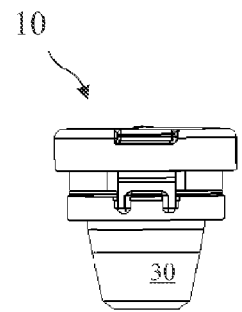
FIG. 7B shows a front view of the tool according to the present invention with the brewing cartridge base held in the tool.
Figure 7E:
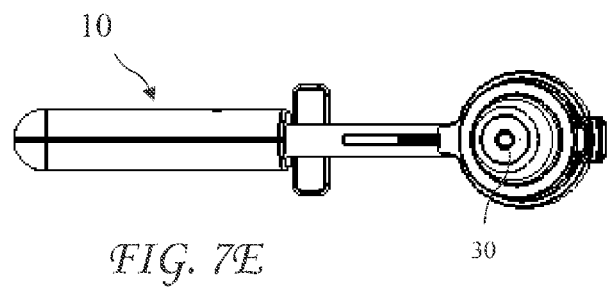
FIG. 7E shows a bottom view of the tool according to the present invention with the brewing cartridge base held in the tool.

A side view of the tool 10 with a brewing cartridge base 30 held in the tool 10 is shown in FIG. 7A, a front view of the tool 10 with a brewing cartridge base 30 held in the 10 is shown in FIG. 7B, a rear view of the tool 10 with a brewing cartridge base 30 held in the 10 is shown in FIG. 7C, a top view of the tool 10 with a brewing cartridge base 30 held in the 10 is shown in FIG. 7D, and a bottom view of the tool 10 with a brewing cartridge base 30 held in the 10 is shown in FIG. 7E. The cartridge base rim 31 (see FIG. 5) is sandwiched between the spacer 18 and holder rim 14. With the tamper open (see FIG. 2), and the spacer 18 closed on the cartridge base rim 31, the tool 10 may be used as a scoop to collect brewing material, the spacer providing an additional portion of untamped brewing material. The tamper 20 may then be closed on the filled brewing cartridge base 30 and spacer 18, tamping all of the untamped brewing material into the brewing cartridge base 30 to provide a filled and tamped brewing cartridge base 30. The cartridge lid 32 (see FIG. 5A) may then be attached to the brewing cartridge base 30 to complete construction of a brewing cartridge.

Figure 8A:
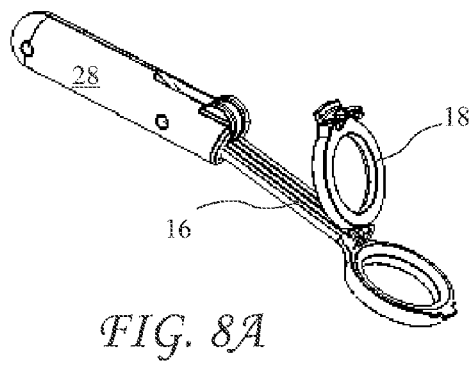
FIG. 8A shows a perspective view of the tool according to the present invention, with the tamper removed and the spacer open.
Figure 8B:
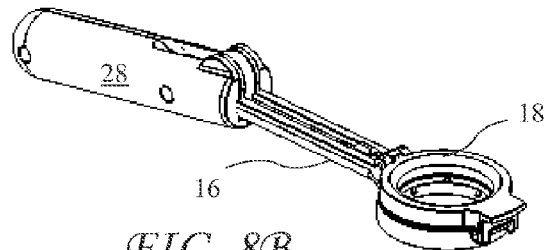
FIG. 8B shows a perspective view of the tool according to the present invention, with the tamper removed and the spacer closed.
Figure 8C:
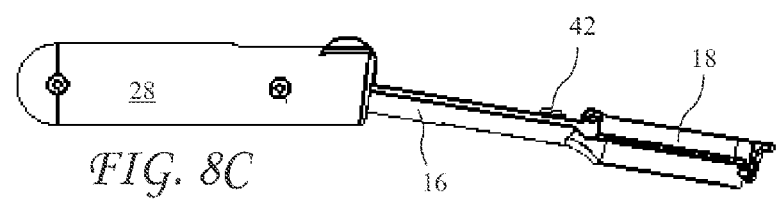
FIG. 8C shows a side view of the tool according to the present invention, with the tamper removed and the spacer closed.
Figure 8D:
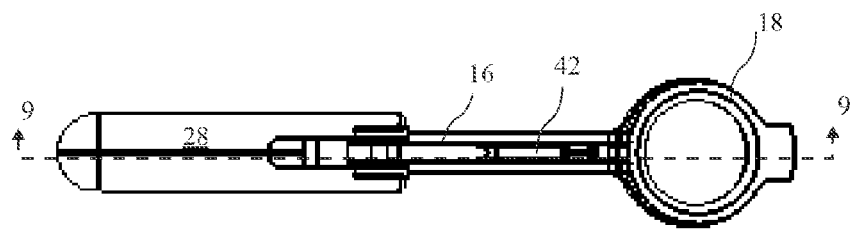
FIG. 8D shows a top view of the tool according to the present invention, with the tamper removed and the spacer closed.
Figure 9:
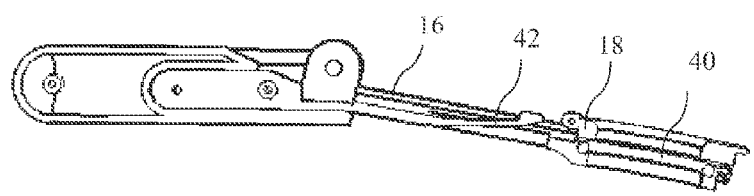
FIG. 9 is a cross-sectional view of the tool according to the present invention, with the tamper removed and the spacer closed, taken along line 9-9 of FIG. 8D.

A perspective view of the tool 10, with the tamper 20 removed and the spacer 18 open is shown in FIG. 8A and a perspective view of the tool 10, with the tamper 20 removed and the spacer 18 closed is shown in FIG. 8B. A side view of the tool 10, with the tamper 20 removed and the spacer 18 closed is shown in FIG. 8C, a top view of the tool 10, with the tamper 20 removed and the spacer 18 closed is shown in FIG. 8D, and a cross-sectional view of the tool 10 with the tamper 20 removed and the spacer 18 closed, taken along line 9-9 of FIG. 8D, is shown in FIG. 9. The holder arm 16 includes a biasing arm 42 reaching forward and upward. When the tamper 20 is closed to tamp brewing material held in the spacer 18 and the brewing cartridge base 30, the biasing arm 42 pushed down by the tamper arm 22. When the tamper 20 is released, the biasing arm 42 pushes the tamper 20 up and away from the spacer.

Figure 10:
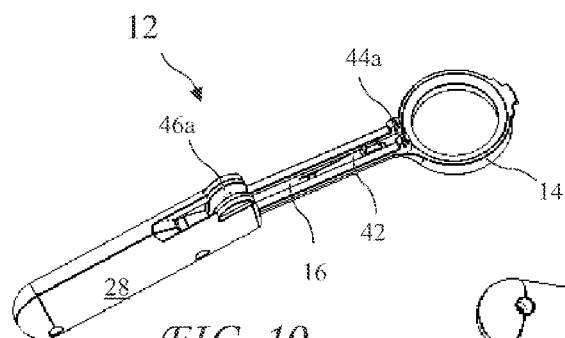
FIG. 10 is a top perspective view of the cartridge holder according to the present invention.
Figure 11:
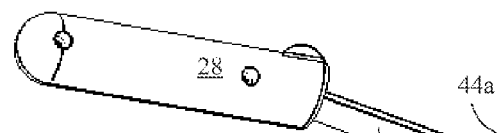
FIG. 11 is a bottom perspective view of the cartridge holder according to the present invention.
Figure 12C:
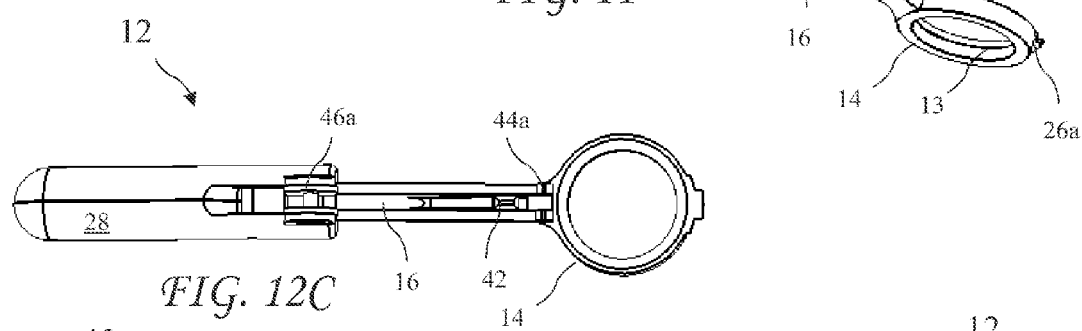
FIG. 12C is a top view of the cartridge holder according to the present invention.
Figure 12A:
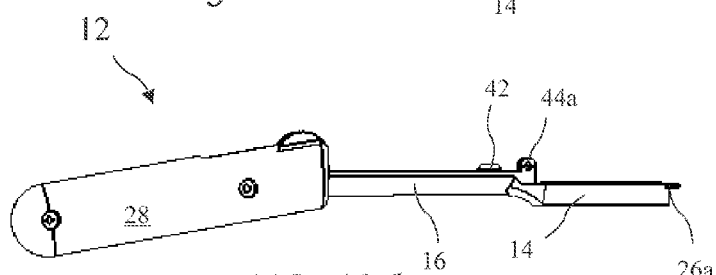
FIG. 12A is a side view of the cartridge holder according to the present invention.
Figure 12B:
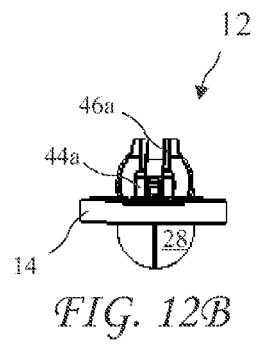
FIG. 12B is a front view of the cartridge holder according to the present invention.
Figure 12D:
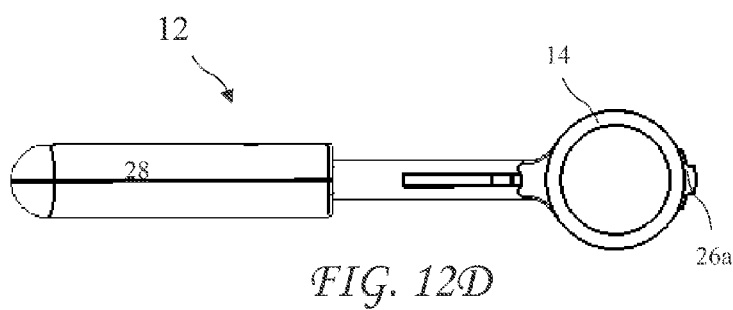
FIG. 12D is a bottom view of the cartridge holder according to the present invention.

A top perspective view of the cartridge holder 12 is shown in FIG. 10, a bottom perspective view of the cartridge holder 12 is shown in FIG. 11, a side view of the cartridge holder 12 is shown in FIG. 12A, a front view of the cartridge holder 12 is shown in FIG. 12B, a top view of the cartridge holder 12 is shown in FIG. 12C, and a bottom view of the cartridge holder 12 is shown in FIG. 12D. The cartridge holder 12 includes hinge 46a cooperating with the hinge 46b (see FIGS. 16-17D) of the tamper arm 22 and hinge 44a cooperating with hinge 44b (see FIGS. 13-15D) of the spacer 12. The cartridge holder 12 further includes the latch portion 26a for cooperation with the latch portion 26b (see FIGS. 13-15D) of the spacer 12 to latch the spacer 12 in the closed position for scooping brewing material. An O-ring 13 resides in the holder rim 14 to provide the interference fit to the brewing cartridge base 30.

Figure 13:
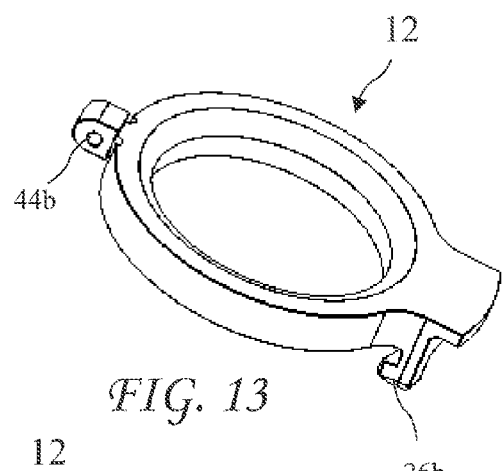
FIG. 13 is a top perspective view of the spacer according to the present invention.
Figure 14:
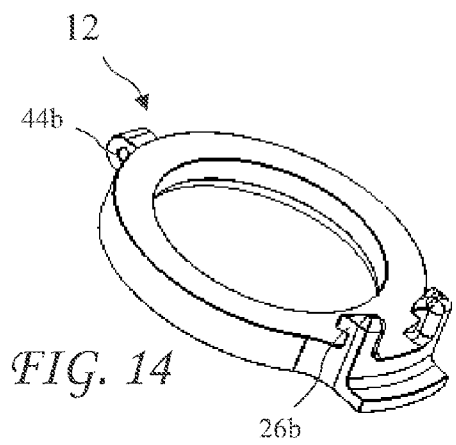
FIG. 14 is a bottom perspective view of the spacer according to the present invention.
Figure 15C:
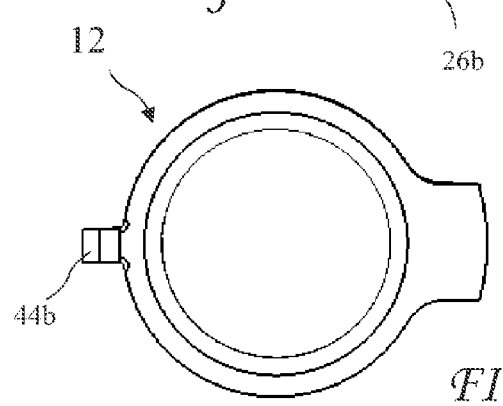
FIG. 15C is a top view of the spacer according to the present invention.
Figure 15A:
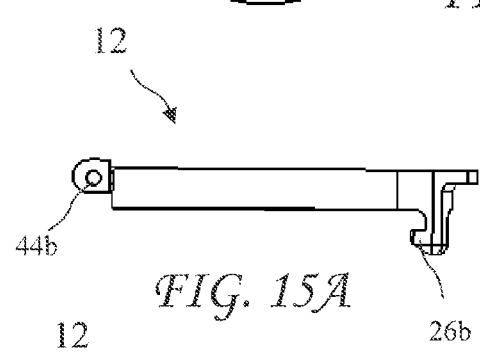
FIG. 15A is a side view of the spacer according to the present invention.
Figure 15B:
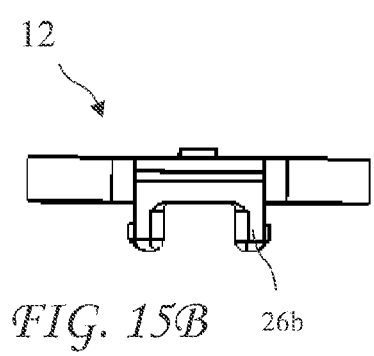
FIG. 15B is a front view of the spacer according to the present invention.
Figure 15D:
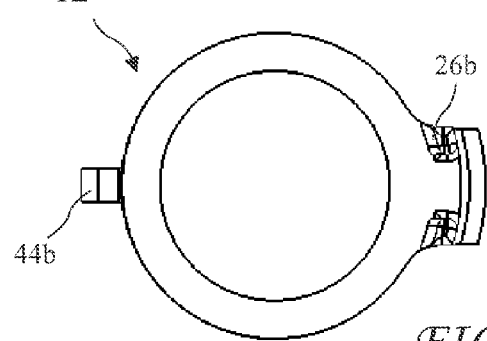
FIG. 15D is a bottom view of the spacer according to the present invention.

A top perspective view of the spacer 12 is shown in FIG. 13, a bottom perspective view of the spacer 12 is shown in FIG. 14, a side view of the spacer 12 is shown in FIG. 15A, a front view of the spacer 12 is shown in FIG. 15B, a top view of the spacer 12 is shown in FIG. 15B, and a bottom view of the spacer 12 is shown in FIG. 15B. The spacer 12 includes hinge portion 44b for cooperation with hinge portion 44a of the cartridge holder 12 (see FIGS. 10-12D) and latch portion 26b for cooperation with the latch portion 26a of the cartridge holder 12 to latch the spacer 12 in the closed position for scooping brewing material.

Figure 16:
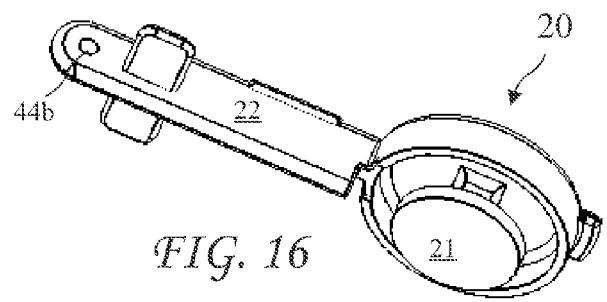
FIG. 16 is a bottom perspective view of the tamper according to the present invention.
Figure 17C:
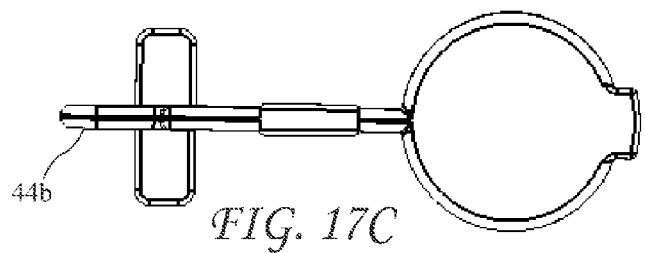
FIG. 17C is a top view of the tamper according to the present invention.
Figure 17A:
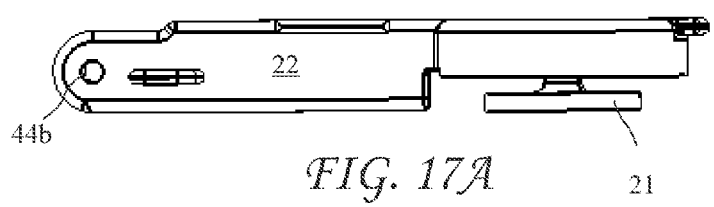
FIG. 17A is a side view of the tamper according to the present invention.
Figure 17B:
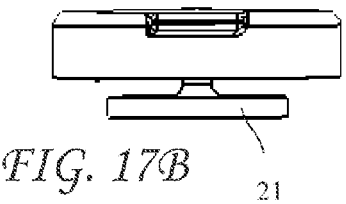
FIG. 17B is a front view of the tamper according to the present invention.
Figure 17D:
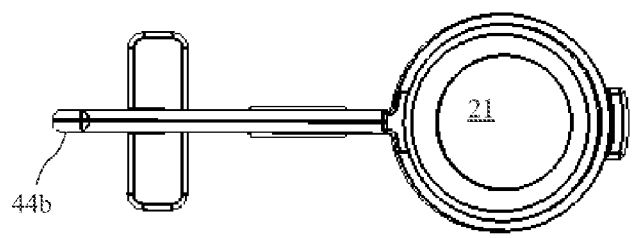
FIG. 17D is a bottom view of the tamper according to the present invention.

A bottom perspective view of the tamper 20 is shown in FIG. 16, a side view of the tamper 20 is shown in FIG. 17A, a front view of the tamper 20 is shown in FIG. 17B, a top view of the tamper 20 is shown in FIG. 17C, and a bottom view of the tamper 20 is shown in FIG. 17D. The tamper 20 includes the hinge portion 44b for cooperation with the hinge portion 44a of the cartridge holder 12 (see FIGS. 10-12D), and the tamper piston 21 for tamping the brewing material in the spacer 18 and brewing cartridge base 30.

Figure 18:
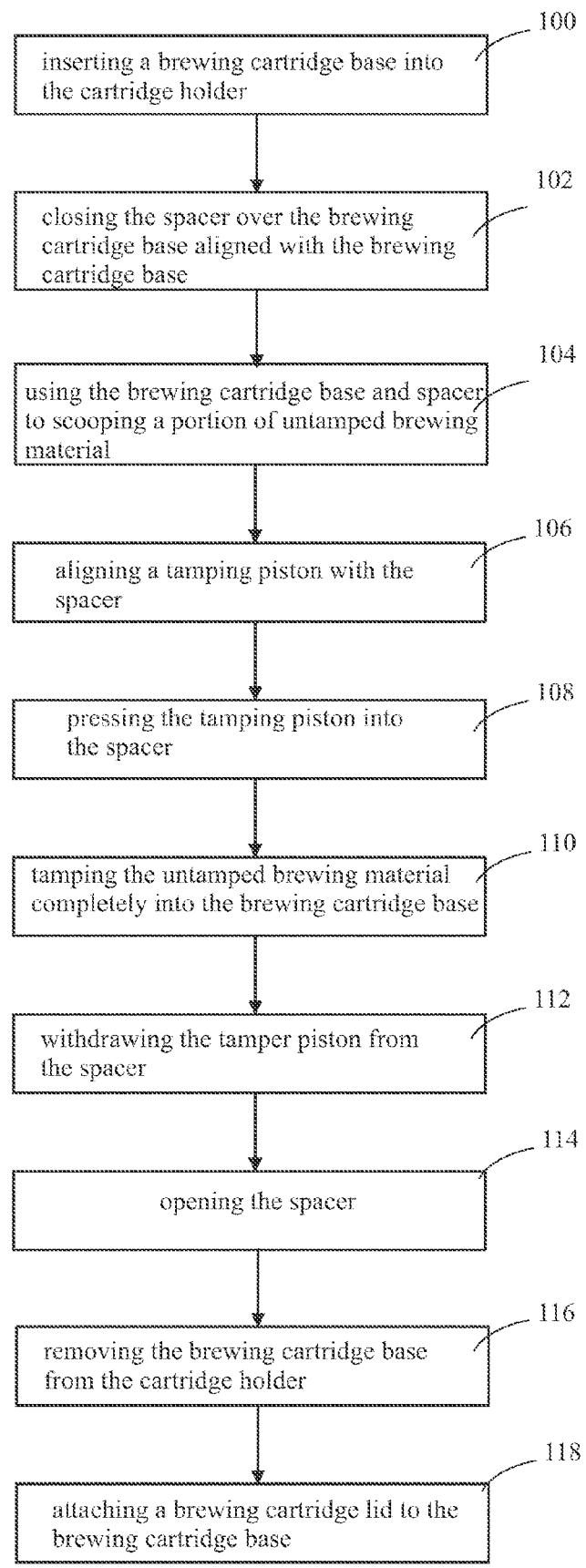
FIG. 18 is a method for constructing a brewing cartridge according to the present invention, using the tool.

A method for constructing a brewing cartridge is described in FIG. 18. The method includes inserting a brewing cartridge base into the cartridge holder at step 100, closing the spacer over the brewing cartridge base aligned with the brewing cartridge base at step 102, using the brewing cartridge base and spacer to scooping a portion of untamped brewing material at step 104, aligning a tamping piston with the spacer at step 106, pressing the tamping piston into the spacer at step 108, tamping the untamped brewing material completely into the brewing cartridge base at step 110, withdrawing the tamper piston from the spacer at step 112, opening the spacer at step 114, removing the brewing cartridge base from the cartridge holder at step 116, and attaching a brewing cartridge lid to the brewing cartridge base at step 118.

The tool is preferably made from plastic and the spacer latches 26a and 26b preferably engage by bending the plastic.

While the invention herein disclosed has been described by means of specific embodiments and applications thereof, numerous modifications and variations could be made thereto by those skilled in the art without departing from the scope of the invention set forth in the claims.

I claim:

1. A tool for making a brewing cartridge, comprising:
   a cartridge holder including a generally horizontally residing holder rim configured for supporting a cartridge rim of a brewing cartridge base inserted into the cartridge holder;
   a spacer configured to reside over the cartridge rim and having a cross-sectional area corresponding to a mouth of the brewing cartridge base and a depth selected to capture an additional portion of untamped brewing material, a total volume of the untamped brewing material in the brewing cartridge base and the spacer tampable to reside entirely in and filling the brewing cartridge base; and
   a tamper piston configured to insert into the spacer and configured to tamp the untamped brewing material into the brewing cartridge base,
   wherein:
   the holder rim resides at a forward end of a holder arm;
   the tamper piston is at a tamping end of a tamper arm; and
   the tamper arm is pivotally attached to the holder arm to align the tamper piston with the spacer for tamping.

2. The tool of claim 1, wherein the holder rim is configured to provide an interference fit of the brewing cartridge base held in the holder rim.

3. The tool of claim 1, wherein the holder rim is a closed circle configured for vertical insertion of the brewing cartridge base into the holder rim.

4. The tool of claim 1, wherein the holder rim is U-shaped and configured for horizontal insertion of the brewing cartridge base into the holder rim.

5. The tool of claim 1, wherein the spacer is attachable to the holder rim for filling the cartridge and detachable from the holder rim after tamping the brewing material.

6. The tool of claim 1, wherein the spacer is attachable to the cartridge holder to close over the holder rim for filling the cartridge and tamping the untamped brewing material in the cartridge, and detachable from the cartridge holder after tamping the brewing material.

7. The tool of claim 1, wherein the spacer is pivotable on the cartridge holder to close over the holder rim for filling the cartridge and tamping the brewing material in the cartridge, and pivotable on the cartridge holder away from the holder rim after tamping the brewing material.

8. The tool of claim 1, wherein the tamper piston is detached from the cartridge holder and spacer and is configured to be aligned and pressed into the spacer by a user.

9. The tool of claim 1, further including a biasing member cooperating with the tamper arm and the holder arm to bias the tamper piston away from the spacer.

10. The apparatus of claim 9, wherein the biasing member extends upward from the holder arm and contacts the tamper arm to bias the tamper arm away from the spacer when the tamper piston in proximal to the spacer.

11. The apparatus of claim 1, further including a handle extension extending from the holder opposite to the holder rim, the handle extension configured for grasping by a user to scoop a portion of the untamped brewing material from a brewing material container.

12. A tool for making a brewing cartridge, comprising:
    a cartridge holder including a generally horizontally residing holder rim configured for supporting a cartridge rim of a brewing cartridge base inserted into the cartridge holder;

a spacer configured to reside over the cartridge rim and having a cross-sectional area corresponding to a mouth of the brewing cartridge base and a depth selected to capture an additional portion of untamped brewing material, a total volume of the untamped brewing material in the brewing cartridge base and the spacer tampable to reside entirely in and filling the brewing cartridge base; and a tamper piston configured to insert into the spacer and configured to tamp the untamped brewing material into the brewing cartridge base, wherein the holder rim includes an O-Ring to provide the interference fit to the brewing cartridge base.

13. A tool for making an espresso cartridge, comprising:
a cartridge holder comprising:
    a holder arm; and
    a generally horizontally residing holder rim at a forward end of the holder arm, the holder rim configured to support an espresso cartridge rim of an espresso cartridge base and providing an interference fit between the holder rim and the espresso cartridge base;
a spacer configured to attach over the cartridge holder, the spacer comprising:
    a spacer pivot cooperating with the cartridge holder and configured to position the spacer in alignment with a cartridge mouth of the espresso cartridge base; and
    a spacer passage having a cross-sectional area corresponding to a mouth of the espresso cartridge base and a depth selected to capture an additional portion of untamped brewing material, a total volume of the untamped brewing material in the espresso cartridge base and the spacer tampable to reside entirely in and filling the untamped brewing material base;
a tamper comprising:
    a tamper arm hingedly attached to the holder arm at a hinged end; and
    a tamper piston attached to the tamper arm opposite to the hinged end and configured to insert into the spacer and tamp the untamped brewing material;
a biasing member cooperating with the tamper arm and the holder arm to bias the tamper piston away from the spacer; and
a handle extension extending from the cartridge holder opposite to the holder rim, the handle configured for grasping by a user to scoop a portion of the untamped brewing material from a brewing material container.

14. A method for constructing a brewing cartridge, comprising:
    inserting a brewing cartridge base into a cartridge holder, the cartridge holder including a generally horizontally residing holder rim configured for supporting a cartridge rim of a brewing cartridge base inserted into the cartridge holder;
    closing a spacer over the brewing cartridge base aligned with the brewing cartridge base, the spacer configured to reside over the cartridge rim and having a cross-sectional area corresponding to a mouth of the brewing cartridge base and a depth selected to capture an additional portion of untamped brewing material, a total volume of the untamped brewing material in the brewing cartridge base and the spacer tampable to reside entirely in and filling the brewing cartridge base;
    using the brewing cartridge base and spacer to scoop a portion of untamped brewing material;
    aligning a tamping piston with the spacer;
    pressing the tamping piston into the spacer;
    tamping the untamped brewing material completely into the brewing cartridge base;
    withdrawing the tamper piston from the spacer;
    opening the spacer;
    removing the brewing cartridge base from the cartridge holder; and
    attaching a brewing cartridge lid to the brewing cartridge base.

* * * * *